Dec. 29, 1970   W KULISCHENKO ET AL   3,551,807
MANUALLY ADJUSTABLE ELECTRICAL PROBE FOR TESTING
PRINTED CIRCUITS AND THE LIKE
Filed Dec. 16, 1968

INVENTORS.
Walter Kulischenko
BY  Joseph A. Burke

Edward A. Sager

ATTORNEY.

United States Patent Office 3,551,807
Patented Dec. 29, 1970

3,551,807
MANUALLY ADJUSTABLE ELECTRICAL PROBE FOR TESTING PRINTED CIRCUITS AND THE LIKE
Walter Kulischenko, Staten Island, N.Y., and Joseph A. Burke, Elizabeth, N.J., assignors to Pennwalt Corporation, a corporation of Pennsylvania
Filed Dec. 16, 1968, Ser. No. 784,116
Int. Cl. G01r 1/06, 31/02
U.S. Cl. 324—72.5        3 Claims

ABSTRACT OF THE DISCLOSURE

A probe for checking or monitoring an electrical circuit is provided with simplified structure including a unitary resilient member and three screw cams engaging the resilient member for manually adjusting the probe tip in all directions relative to its fixed supporting body.

---

This invention relates to adjustable electrical probes, especially those of the type adapted for checking or monitoring an electrical circuit.

It will suffice to say that there are numerous applications for adjustable electrical probes. One example is the checking of resistivity of a specimen, as by placing the tips of a pair of probes in contact with terminals of the specimen to establish an electrical circuit with an ohmmeter or the like. Such an arrangement has been effectively employed in combination with apparatus for trimming printed resistors of printed circuits to a desired resistance, an operation which involves a preliminary reading as well as monitoring during trimming and a final reading.

Older probes of the type set forth have not been entirely satisfactory from the standpoint of convenience, cost, or dependability, whereas the probe of the present invention appears to overcome the disadvantages of the previous devices due to its simple, rugged, effective and inexpensive construction.

Briefly stated, the probe of the present invention includes a body having means for securing it to supporting structure, also a movable leaf spring of conductive material carrying a replaceable probe tip at a free end thereof, and separate camming members in operative association with the cantilevered leaf spring for moving the leaf spring longitudinally, angularly to effect lateral side-to-side movement, as well as up or down movement at the free end. The leaf spring is electrically conductive between the probe tip and the oppoosite end thereof where an electrical terminal is provided.

Figure 1:
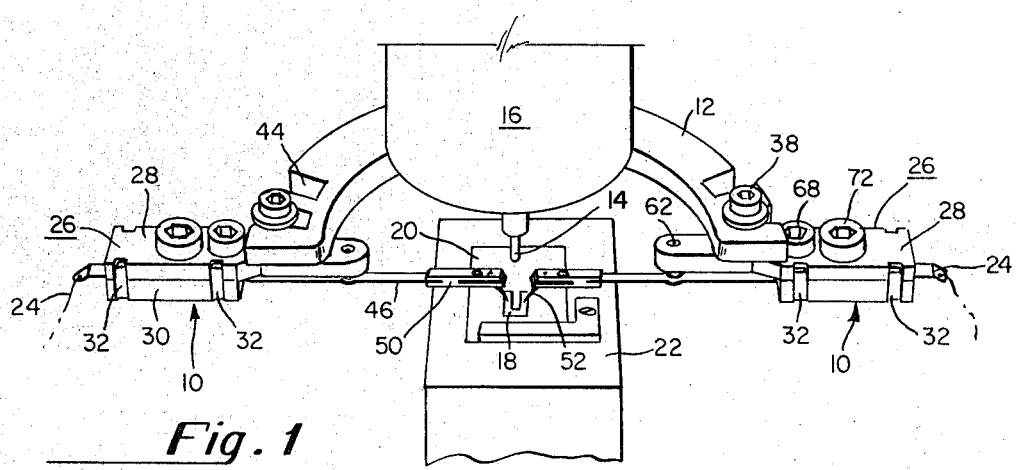
Figure 2:
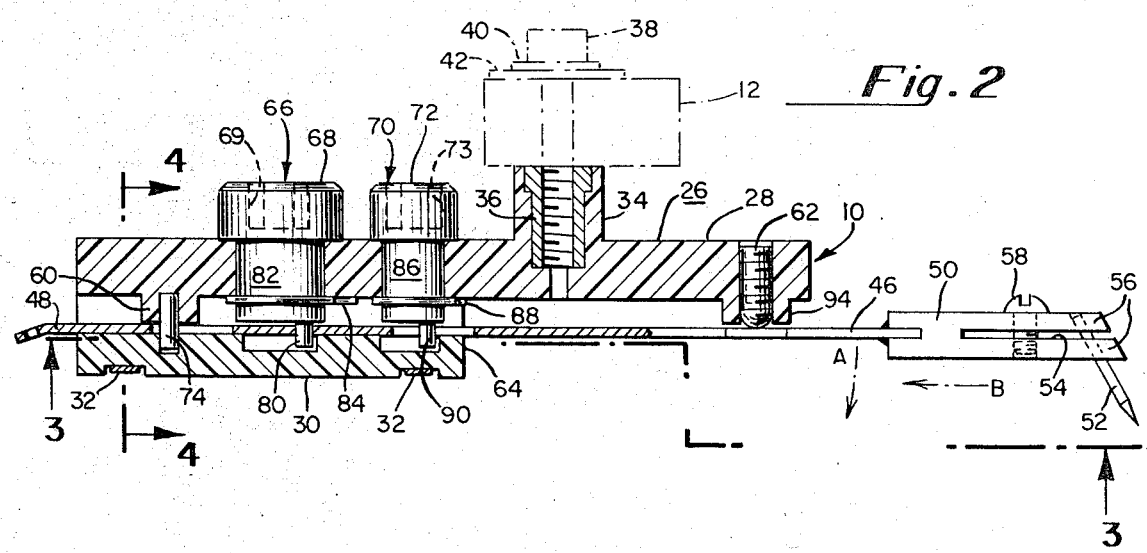
Figure 3:
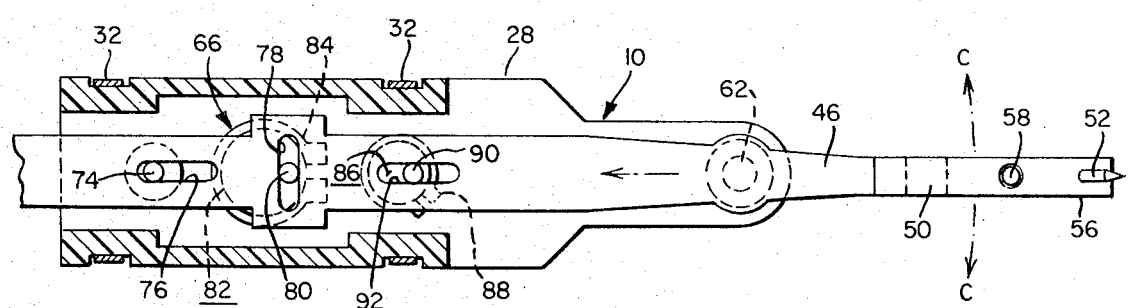
Figure 4:
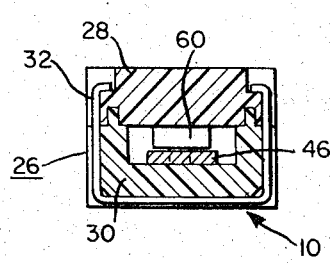

In the drawings:
FIG. 1 is a perspective view of a pair of probes according to the invention, showing them arranged to check an electrical characteristic of a printed circuit specimen undergoing trimming by abrading apparatus;
FIG. 2 is a longitudinal sectional view through the body of a probe embodying the invention, taken vertically, with other portions of the probe shown in elevation;
FIG. 3 is a view similar to FIG. 2, but taken horizontally along line 3—3 of FIG. 2, exposing almost the full length of the leaf spring and associated camming members; and
FIG. 4 is a fragmentary transverse sectional view of the probe, taken along line 4—4 of FIG. 2.

Shown in FIG. 1 are a pair of adjustable probes 10, secured to an arcuate supporting member 12 extending about the movable abrading nozzle 14 of abrading apparatus 16. The nozzle 14 is adapted to discharge a high velocity stream of airborne abrasive powder toward a resistor 18 printed on a non-conductive plate or substrate 20. The latter is clamped to a workpiece holder 22. The arrangement illustrates a functional setting for the probes 10 wherein the resistivity or other electrical characteristic of a specimen can be checked by contact therewith and connection by leads 24 to a suitable ohmmeter or measuring device (not shown).

As best seen in FIGS. 1 and 2, the probe 10 has an elongated body 26 including a longitudinally extending upper element 28 and a somewhat shorter lower element 30 which are held together by a pair of C-shaped spring clamps 32 received in correspondingly shaped retaining grooves in the body 26.

In order to securely fasten the probe 10 to the supporting member 12, an upstanding boss 34 is formed on the upper element 28. The boss 34 is adapted to receive a sleeve 36 having threads cooperating with the threads of a vertically elongated screw 38, the head of which transmits a clamping force through a lock washer 40 and a flat ring washer 42 to the supporting member 12 against the boss 34 of the probe 10. With suitable radial slots 44 in the supporting member 12 and the aforesaid clamping arrangement the body 26 of the probe 10 is readily and securely positioned in approximate relation to the substrate 20 for making contact therewith, tightening being accomplished by merely turning the screw 38.

The body 26 of the probe 10 is made of a suitable nonconductive material, preferably one that is rugged and moldable, for example glass filled nylon.

The probe 10 is further provided with an elongated leaf spring 46 of resilient and highly conductive material such as beryllium copper. It is the function of the leaf spring 46 to conduct an electrical signal or current therethrough from one end to the other, also to yieldingly resist deflection when biased upwardly or downwardly during fine adjustment of the probe.

One end of the leaf spring 46 has a terminal 48 in the form of a stubby, apertured flange adapted to receive a wire conductor which may be soldered thereto. The terminal 48 extends a short distance from the thick end of the body 26. The other end of the leaf spring 46 is a slender tapered portion which extends longitudinally of the body 26 in opposite direction to the terminal 48, well beyond the lower element 30 and a short distance beyond the upper element 28. The free end of the tapered portion of the leaf spring has a probe tip holder 50 secured thereto, as by welding or brazing, for removably holding a probe tip 52.

The holder 50 may be of the same material as the leaf spring 46, and constructed with a horizontally elongated slot 54 providing a bifurcated end portion 56. A set screw 58 serves to close or open the slot 54 for respectively tightening or loosening the probe tip 52 in the holder 50. The probe tip 52 is snugly received in a hole of constant circular cross section which is drilled in the bifurcated end portion 56 of the holder 50 when the set screw 58 is absent or loosely installed. Thus, when the set screw 58 is tightened to deflect the bifurcations toward one another, the hole portions therein are misaligned and the probe tip 52 is held tightly. This provision permits easy replacement of the probe tip when desired.

The probe tip 52 is preferably made of tungsten carbide material, noted for its durability.

As shown in FIGS. 2, 3 and 4, the leaf spring 46 is held by the body 26 somewhat as a built-in, but movable, cantilever gripped lightly near its terminal end between the lower element 30 and the internal boss 60 projecting downwardly from the upper element 28. The leaf spring 46 is further held by the coupling force exerted downwardly by a camming screw 62 against the leaf spring 46 and resisted at 64 by an end portion of the lower element 28, all with the aid of friction. With this arrangement, turning the screw 62 to advance it downwardly against the leaf spring 46 deflects the latter downwardly in the direction A indicated by the arrow in FIG. 2, and the probe tip 52 moves therewith. Turning the screw 62 in opposite direction obviously reduces the deflection of the leaf spring 46 and raises the tip 52.

As will next be explained, movement in the longitudinal direction of the leaf spring 46 and tip 52 as indicated by the arrow B and also the direction opposite thereto is effected by a cam assembly 66 including a rotatable head 68 with a socket 69 adapted to receive a hexagonal (Allen head) wrench. Similarly, angular movement of the leaf spring 46 and tip 52 about a point near its terminal 48 and in a lateral direction, as indicated by the arrow designated C, is effected by a cam assembly 70 including a rotatable head 72 and socket 73 similar to head 68. A transverse pivot pin 74, also a slot 76 in the leaf spring 46, combine to provide an assembly for guiding the longitudinal movement of spring 46 and also as a pivot for the described angular movement of the spring 46.

The tip 52 of probe 10 is shown in FIGS. 2 and 3 positioned near the uppermost portion of its path of vertical movement, at the extreme outer position of its path of longitudinal movement, and centered in its path of lateral or angular movement.

LONGITUDINAL MOVEMENT

Referring again to cam assembly 66 and FIGS. 2 and 3, there is further included a transverse slot 78 in spring 46, best seen in FIG. 2. Slot 78 receives a driving pin 80 eccentrically mounted on a rotatable shaft 82 connected to head 68. In order to retract tip 52 in direction B the shaft 82 is rotated either clockwise or counterclockwise, so that pin 80 engages slot 78 and transports spring 46. Angular rotation of shaft 82 for 180° moves tip 52 to the other extreme end of its longitudinal path of movement from the position illustrated; and 90° of angular rotation of shaft 82 from that shown locates the 52 in mid-position of its longitudinal travel path. It is to be noted that the guide assembly 74, 76 and the other cam 70 are so constructed and arranged that there is no interference with the longitudinal movement just described. Shaft 82 is secured to the upper element 28 by means of a retaining spring 84 received in an annular groove of shaft 82, as shown.

ANGULAR OR LATERAL MOVEMENT

The probe tip 52 is moved in direction C by cam assembly 70. The latter includes a shaft 86 driven by head 72, retained by a spring 88, and carrying an eccentrically mounted driving pin 90. The arrangement of the driving elements of assembly 70 is like that of assembly 66. Leaf spring 46 is provided with a longitudinal slot 92 adapted to receive pin 90 in driving relationship. From the starting position of FIG. 3, 90° of clockwise angular movement of shaft 86 will move the tip 52 downwardly in direction C, and counterclockwise movement of 90° will move the tip upwardly in direction C, in both cases such movement is angular about pivot pin 74. The positional relationship of pin 80 and slot 78 of assembly 66 is such that there is no interference with the lateral angular movement in direction C just described.

In the cam assemblies 66 and 70 the surfaces of the leaf spring 46 at the margins of the slots 78 and 92 are driven surfaces adapted to be engaged by the respective driving pins.

VERTICAL MOVEMENT

Vertical adjustment of the camming screw 62 is performed by such means as a wrench inserted in a hexagonal socket in the head thereof to turn the screw and thereby move it either toward or away from the leaf spring 46. As shown in FIG. 2 the screw 62 is received in an internally threaded boss 94, the lower end of which has as an abutment surface for limiting upward movement of the leaf spring. Rotation of the screw 62 which advances the screw 62 downwardly and toward the leaf spring 46 deflects the leaf spring downwardly about point 64 and thus lowers the tip 52 in direction A. In order to raise the tip 52 the screw 62 is turned in opposite direction so that the inherent resilience of the leaf spring 46 urges it back toward its undeflected position but to the extent limited by the lower end of screw 62; and the tip 52 moves therewith in a wider arc.

OPERATION

The probe 10 is secured to the supporting member 12 by clamping screw 38 with the probe tip 52 in closely spaced relation to the specimen, e.g. resistor 18, near the desired point of contact therewith. Then, using wrenches or other tools suited for driving the cam assemblies 66 and 70 and screw 62, the probe tip 52 is adjustably positioned by moving its supporting leaf spring longitudinally, also angularly in a lateral or horizontal plane, and vertically, as previously described, to the extent necessary to establish contact between the tip 52 and the specimen. The adjustments in various directions may be done separately or simultaneously as desired.

The invention also contemplates that after positioning one or more probes 10 relative to a specimen, it may be possible to raise and lower the supporting member 12 by separate elevating means (not shown) to effect immediate disengagement or engagement of the tips 52 with the specimen. This provision may be desired for intermittent monitoring of the electrical characteristics of the specimen or when it is preferred to remove the tips 52 from the specimen to perform some work thereon. In addition, the arrangement is suited to the performance of an operation, e.g. resistor trimming, on a number of identical specimens using the same set-up; in which case only occasional positional adjustment may be required. For such mass production use, the probe tips 52 are accurately positioned on a first specimen and thereafter it is only necessary to establish and disestablish contact with subsequent specimens by providing suitable means for effecting relative movement between the workpiece holder 22 and the combination of probes 10 and their supporting member 12.

The invention can be practiced by reversing or transposing parts defining the driving and driven surfaces of said cam assemblies.

What is claimed is:

1. A probe for checking electrical circuitry including a tip adapted to establish contact with a specimen, an elongated, resilient member carrying said tip at one end portion thereof, an insulated body supporting said resilient member, means for securing said body to a support, and means for adjusting the position of said tip in various positions relative to said body; said adjusting means comprising first, second and third cam assemblies each connected to said body in operative association with said resilient member for effecting movement of said resilient member and said tip therewith in respective first, second and third directions; said first direction being longitudinally of said member, said second direction being lateral to the longitudinal extent of said member, and said third direction also being lateral to the longitudinal extent of said member but at generally right angles to said second direction; said tip and said resilient member being made of electrically conductive material; each of said first and second cam assemblies comprising a shaft mounted for rotation on said body, a driving member on said shaft with a driving surface disposed eccentrically with respect to the rotational axis of said shaft, and a driven surface on said resilient member adapted to be engaged by the driving surface of said driving member for effecting movement of said resilient member, with a transversely extending slot defining the driven surface of said first cam assembly and a longitudinally extending slot defining the driven surface of said second cam assembly; each of said first and second cam assemblies including a pin comprising said driving member and being received in its associated slot; said second cam assembly further including a pivot pin at the other end of said resilient member extending therethrough, and wherein said longitudinally extending slot is disposed intermediate said end portions, the construction and arrangement being such that lateral movement of said resilient member in said second direction is angular about said pivot pin whereby the path of movement of said probe tip is arcuate; said third cam assembly comprising a threaded member received in a hole in said body having threads cooperating with said threaded member for effecting movement, toward said resilient member by turning said threaded member in one rotational direction, and away from said resilient member by turning said threaded member in a second rotation direction opposite to said one rotational direction, said threaded member being engageable with said resilient member to effect deflection thereof in said third direction.

2. A probe as described in claim 1 further including means for removably carrying said tip, said carrying means comprising a bifurcated element of resilient construction having aligned holes of constant circular cross section formed in the bifurcations of said element and adapted to snugly receive said tip, and means for releasably holding said bifurcations deflected toward one another whereby the normally aligned holes thereof are misaligned and the tip is tightened and securely held by said bifurcated element of said carrying means.

3. The combination with the probe described in claim 1 of a support to which said probe is connected by said securing means, and a workpiece holder for holding the specimen to be contacted by the tip of said probe, said support and said workpiece holder being movable relative to one another for engaging and disengaging said probe tip with said specimen.

References Cited

UNITED STATES PATENTS

| | | | |
|---|---|---|---|
| 3,185,927 | 5/1965 | Margulis | 324—158 |
| 3,264,556 | 8/1966 | Krantz | 324—158X |
| 3,345,567 | 10/1967 | Turner | 324—158 |
| 3,437,929 | 4/1969 | Glenn | 324—158 |
| 3,453,545 | 7/1969 | Oates | 324—158 |

ALFRED E. SMITH, Primary Examiner

U.S. Cl. X.R.

324—158